(12) United States Patent
Swinkels et al.

(10) Patent No.: US 9,769,059 B2
(45) Date of Patent: Sep. 19, 2017

(54) FAST INTERLAYER FORWARDING

(71) Applicant: Ciena Corporation, Hanover, MD (US)

(72) Inventors: Gerard Leo Swinkels, Ottawa (CA); Sumant Chandavarkar, Ottawa (CA)

(73) Assignee: Ciena Corporation, Hanover, MD (US)

( * ) Notice: Subject to any disclaimer, the term of this patent is extended or adjusted under 35 U.S.C. 154(b) by 111 days.

(21) Appl. No.: 14/750,477

(22) Filed: Jun. 25, 2015

(65) Prior Publication Data
US 2016/0380880 A1   Dec. 29, 2016

(51) Int. Cl.
| | |
|---|---|
| H04L 12/707 | (2013.01) |
| H04L 12/741 | (2013.01) |
| H04L 12/947 | (2013.01) |
| H04L 12/931 | (2013.01) |
| H04L 12/755 | (2013.01) |
| H04L 12/713 | (2013.01) |
| H04L 12/935 | (2013.01) |

(52) U.S. Cl.
CPC ............ H04L 45/22 (2013.01); H04L 45/021 (2013.01); H04L 45/586 (2013.01); H04L 45/745 (2013.01); H04L 49/30 (2013.01); H04L 49/65 (2013.01)

(58) Field of Classification Search
CPC ....... H04L 45/22; H04L 45/745; H04L 49/25; H04L 12/28; H04L 12/50; H04L 12/707; H04L 12/741; H04L 12/947; H04L 45/00; H04L 45/021; H04L 45/50; H04L 45/586; H04L 49/30; H04L 49/65
See application file for complete search history.

(56) References Cited

U.S. PATENT DOCUMENTS

| | | | |
|---|---|---|---|
| 6,795,394 B1 | 9/2004 | Swinkels et al. | |
| 7,616,578 B2 | 11/2009 | Chandrasekaran | |
| 7,843,906 B1 * | 11/2010 | Chidambaram | .... H04L 47/6205 370/386 |
| 7,995,569 B2 | 8/2011 | Ashwood-Smith et al. | |
| 8,077,726 B1 * | 12/2011 | Kumar | .................... H04L 45/22 370/395.31 |
| 8,085,676 B2 | 12/2011 | Skalecki et al. | |
| 8,166,183 B2 | 4/2012 | Swinkels et al. | |
| 8,462,661 B2 | 6/2013 | Phillips et al. | |

(Continued)

OTHER PUBLICATIONS

"Requirements and Framework for Ethernet Service Protection in Metro Ethernet Networks," Metro Ethernet Forum, Feb. 8, 2004, pp. 1-41.

(Continued)

Primary Examiner — Tri H Phan
(74) Attorney, Agent, or Firm — Clements Bernard Walker PLLC; Christopher L. Bernard; Lawrence A. Baratta, Jr.

(57) ABSTRACT

A method, implemented in a packet switch system, for fast interlayer forwarding includes constructing a master Forwarding Information Base (FIB) which associates each of a plurality of packet source addresses with a corresponding member port among a plurality of member ports interconnected by a fabric; and distributing the master FIB to the member ports interconnected by the fabric and to at least one alternate logical port that is not connected to the fabric, wherein the at least one alternate logical port is configured to protect one of the member ports interconnected by the fabric.

20 Claims, 7 Drawing Sheets

(56) References Cited

U.S. PATENT DOCUMENTS

| | | | | |
|---|---|---|---|---|
| 8,638,791 | B2* | 1/2014 | Pacella | H04L 45/00 |
| | | | | 370/392 |
| 8,837,479 | B1* | 9/2014 | Kumar | H04L 12/1877 |
| | | | | 370/228 |
| 8,917,729 | B1* | 12/2014 | Kumar | H04L 45/22 |
| | | | | 370/395.31 |
| 9,049,030 | B1* | 6/2015 | Pogde | H04L 12/18 |
| 9,049,148 | B1* | 6/2015 | Singh | H04L 45/54 |
| 2002/0126671 | A1* | 9/2002 | Ellis | H04L 12/18 |
| | | | | 370/390 |
| 2005/0074001 | A1* | 4/2005 | Mattes | H04L 45/00 |
| | | | | 370/389 |
| 2006/0294211 | A1 | 12/2006 | Amato | |
| 2009/0109852 | A1* | 4/2009 | Grover | H04L 45/02 |
| | | | | 370/235 |
| 2009/0201909 | A1* | 8/2009 | Bou-Diab | H04L 45/00 |
| | | | | 370/351 |
| 2010/0235914 | A1* | 9/2010 | Proulx | H04L 12/413 |
| | | | | 726/23 |
| 2011/0222394 | A1 | 9/2011 | Swinkels et al. | |
| 2011/0255443 | A1 | 10/2011 | Ashwood-Smith et al. | |
| 2014/0112123 | A1 | 4/2014 | Holness et al. | |
| 2016/0352619 | A1* | 12/2016 | Gattani | H04L 45/24 |

OTHER PUBLICATIONS

"EVC Ethernet Services Definitions Phase 3," Metro Ethernet Forum, Aug. 2014, pp. 1-74.

\* cited by examiner

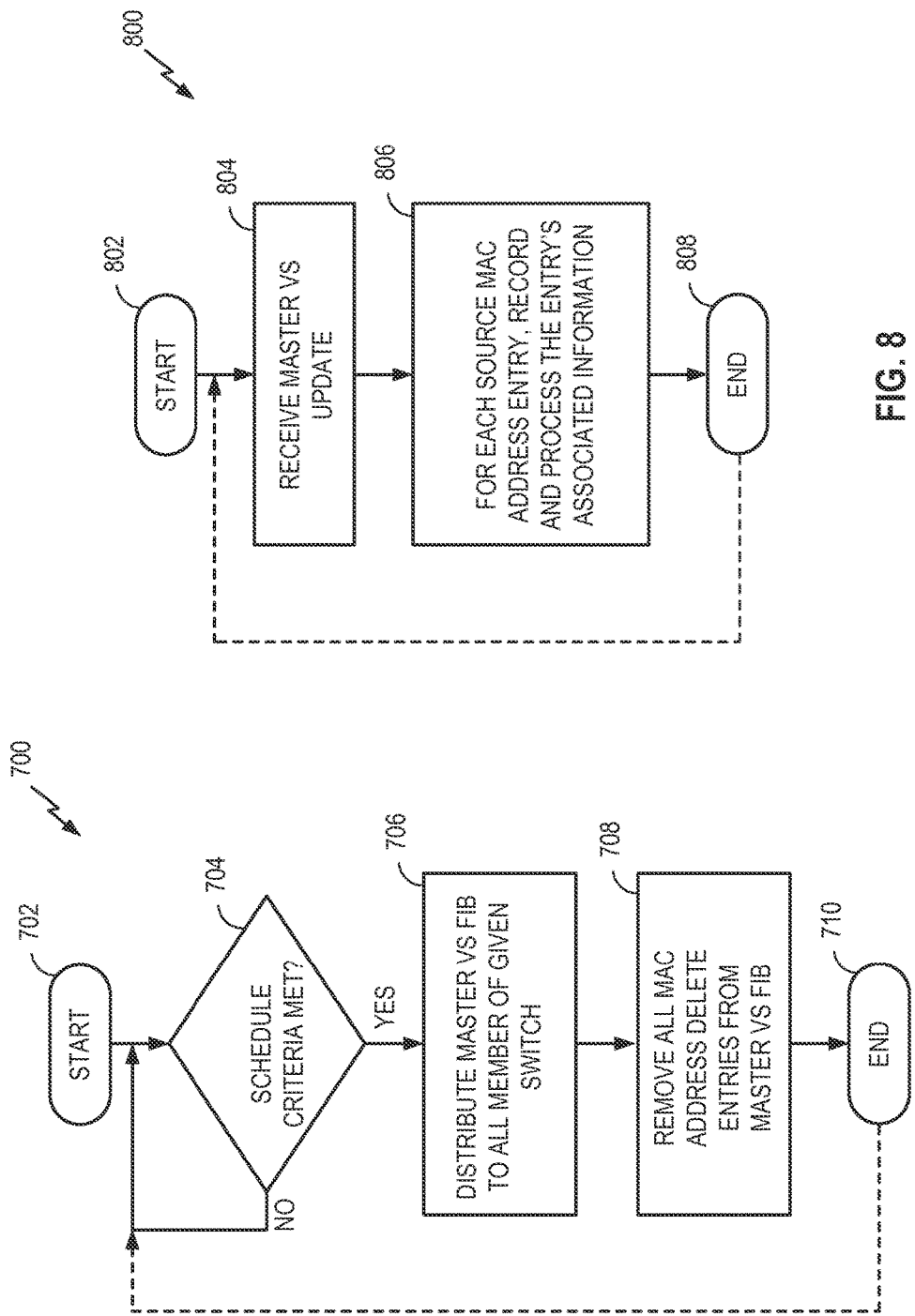

FAST INTERLAYER FORWARDING

FIELD OF THE DISCLOSURE

The present disclosure generally relates to networking systems and methods. More particularly, the present disclosure relates to maintenance and distribution of packet forwarding information to provide a fast interlayer forwarding solution to protect ports while not consuming fabric resources.

BACKGROUND OF THE DISCLOSURE

Conventional techniques of communicating packets through a network can employ multiport virtual switches, particularly for Layer 2 routing. Conventional multiport virtual switches typically have a plurality of logical ports (hereinafter "ports") interconnected by a fabric that can connect any port to any other of the ports. Sources and destinations of packets, which can be termed "devices," can have a unique identifier, for example, a Media Access Control (MAC) address. Packets may include the MAC address of their originating or source device and the MAC address of the intended receiving or destination device. Conventional virtual switches generally include an identifier for each of the ports, and a mechanism for associating or "binding" the source MAC address of packets to the particular port number at which the packet is received.

Conventional techniques for routing or forwarding received packets having a destination MAC address to the port the address is bound include constructing a forwarding table, for example, a Forwarding Information Base (FIB) having the required information, then distributing the FIB to each of the ports. More specifically, each port's local FIB stores a plurality of MAC addresses and, for each, the port (e.g., the port number) to which that address is bound. Therefore, when a port receives a packet having a destination MAC address already in the FIB, it retrieves the number of the port to which that address is bound, and then sends the packet to the fabric with that port number. The fabric, in response, forwards the packet to the identified port.

Ports of a virtual switch, however, can receive packets with a source or destination MAC address not currently in their local FIB. Example reasons are devices being connected and disconnected, being assigned new MAC addresses, or going for extended periods without transmitting packets. If MAC learning is supported, then a port receiving such a packet with an unknown source MAC can respond by, for example, notifying a controller that maintains a master FIB. The controller, in response, can "flood" the ports of the virtual switch to identify which, if any, the "new" destination MAC address is bound to. If the port is identified, the controller can update the master FIB and distribute that update to the local FIB at each of the ports. A port receiving a packet with an unknown destination MAC may send the packet to all the other ports in the virtual switch.

Known conventional techniques of implementing virtual switches include one or more devices such as line cards, modules, circuit packs, blades, pizza boxes (hereinafter referred to as line cards), each providing one or more of the ports, along with storage for the port's local FIB. A conventional line card can also include logic for interfacing with the fabric, for example, through a backplane. The fabric may be implemented as one or more fabric cards or switch cards connected through the backplane.

However, line cards can fail. One conventional technique for providing for recovery from such failure is maintaining one or more spare or stand-by line cards. One such technique maintains one or more spare or stand-by line cards in a "hot standby" state connected to the fabric. The connected state provides for updating the FIB of such stand-by line cards by the master FIB, which sees the connected standby line card as just another of the connected, operational line cards. However, maintaining stand-by line cards in a connected state can incur significant cost, namely an idle resource consuming system resources. Specifically, maintaining stand-by line cards in a connected state adds to the multicast load of a fabric. Multicast is expensive and consumes scarce fabric resources.

Another conventional technique can maintain one or more standby line cards in a disconnected, cold state. This conventional technique can eliminate or substantially reduce the system resource cost of maintaining a standby, connected line card. However, boot-up operations necessary to bring that disconnected, cold state line card to an operational state include the loading of its local FIB, to mirror the current master FIB. This can incur significant cost in system resources and time.

Another known conventional technique providing recovery from line card failure is fast packet switching/reroute by a higher layer of the network, for example, Layer 3. However, this technique can require substantial action, and expenditure of time, by higher-level resources. Also, the fast packet switching/reroute can result in additional multicast, which is expensive and consumes scarce fabric resources.

BRIEF SUMMARY OF THE DISCLOSURE

In an exemplary embodiment, a method, implemented in a packet switch system, for fast interlayer forwarding includes constructing a master Forwarding Information Base (FIB) which associates each of a plurality of packet source addresses with a corresponding member port among a plurality of member ports interconnected by a fabric; and distributing the master FIB to the member ports interconnected by the fabric and to at least one alternate logical port that is disconnected from the fabric, wherein the at least one alternate logical port is configured to protect one of the member ports interconnected by the fabric. The method can further include instantiating a new member port connected to the fabric by connecting the alternate logical port to the fabric, wherein, once connected to the fabric, the new member port processes packets with a FIB already stored thereon based on the distributing. The method can further include removing a failed member port among the member ports by disconnecting the failed member port from the fabric; and instantiating a replacement member port by connecting the alternate logical port to the fabric, wherein, once connected to the fabric, the replacement member port processes packets with a FIB already stored thereon based on the distributing. The at least one alternate logical port can be configured to provide a fast packet switching/reroute technique while not consuming resources on the fabric when disconnected from the fabric. The method can further include instantiating an added member port by connecting the alternate logical port to the fabric; and installing an added port FIB at the added member port, based on the master FIB distributed to the alternate logical port.

The method can further include receiving at the added member port a packet having a source address; checking the added port FIB to determine whether the source address is associated with another of the member ports and, if the source address is associated with another of the member ports, sending to the fabric the packet and an identifier of the another of the member ports, and routing the packet through the fabric to the another of the member ports, based on said identifier. The distributing can distribute the master FIB to a first member port and to a second member port among the member ports, and the method can further include installing a first FIB at the first member port, based on the master FIB distributed to the first member port, and installing a second FIB at the second member port, based on the master FIB distributed to the first member port. The method can further include associating the second member port with a port feed queue of the fabric, wherein the port feed queue is a first member port feed queue, the method can further include instantiating an added member port by connecting the alternate logical port to the fabric, installing an added port FIB at the added member port, based on the master FIB distributed to the alternate logical port, and associating the added member port with a second port feed queue of the fabric. The method can further include updating the first port FIB to indicate the association of the added member port with the second port feed queue of the fabric. The method can further include removing the second member port from the member ports by disconnecting the second member port from the fabric; instantiating a replacement member port by connecting the alternate logical port to the fabric; installing a replacement port FIB at the replacement member port, based on the master FIB distributed to the alternate logical port; and associating the replacement member port with a second port feed queue of the fabric.

In another exemplary embodiment, a packet switch configured for fast interlayer forwarding includes circuitry configured to construct a master Forwarding Information Base (FIB) which associates each of a plurality of packet source addresses with a corresponding member port among a plurality of member ports interconnected by a fabric; and circuitry configured to distribute the master FIB to the member ports interconnected by the fabric and to at least one alternate logical port that is disconnected from the fabric, wherein the at least one alternate logical port is configured to protect one of the member ports interconnected by the fabric. The packet switch can further include circuitry configured to instantiate a new member port connected to the fabric by connecting the alternate logical port to the fabric, wherein, once connected to the fabric, the new member port processes packets with a FIB already stored thereon based on the distributing. The packet switch can further include circuitry configured to remove a failed member port among the member ports by disconnecting the failed member port from the fabric; and circuitry configured to instantiate a replacement member port by connecting the alternate logical port to the fabric, wherein, once connected to the fabric, the replacement member port processes packets with a FIB already stored thereon based on the distributing. The at least one alternate logical port can be configured to provide a fast packet switching/reroute technique while not consuming resources on the fabric when disconnected from the fabric.

The circuitry configured to distribute can be configured to distribute the master FIB to a first member port and to a second member port among the member ports, and the packet switch can further include circuitry configured to install a first FIB at the first member port, based on the master FIB distributed to the first member port, and circuitry configured to install a second FIB at the second member port, based on the master FIB distributed to the first member port. The packet switch can further include circuitry configured to associate the second member port with a port feed queue of the fabric, wherein the port feed queue is a first member port feed queue; circuitry configured to instantiate an added member port by connecting the alternate logical port to the fabric, circuitry configured to install an added port FIB at the added member port, based on the master FIB distributed to the alternate logical port, and circuitry configured to associate the added member port with a second port feed queue of the fabric.

In a further exemplary embodiment, a packet switch system configured for fast interlayer forwarding includes one or more member ports each including an associated Forwarding Information Base (FIB); a fabric interconnecting the one or more member ports; and at least one alternate logical port configured to protect a member port of the one or more member ports, wherein the at least one alternate logical port is disconnected from the fabric while protecting the member port, and wherein the at least one alternate logical port includes an associated FIB that is maintained while the at least one alternate logical port is disconnected from the fabric. The packet switch system can further include a master controller configured to maintain a Master FIB (MFIB) and to distribute updates therefrom to the one or more member ports and the at least one alternate logical port. A new member port can be instantiated responsive to a failure of the member port by connecting the at least one alternate logical port to the fabric, wherein, once connected to the fabric, the new member port processes packets based on the associated FIB that is maintained while the at least one alternate logical port is disconnected from the fabric. The at least one alternate logical port can be configured to provide a fast packet switching/reroute technique while not consuming resources on the fabric when not active.

BRIEF DESCRIPTION OF THE DRAWINGS

The present disclosure is illustrated and described herein with reference to the various drawings, in which like reference numbers are used to denote like system components/method steps, as appropriate, and in which:

FIG. 7 depicts a flow of an example processing in master virtual switch FIB distribution according to one exemplary embodiment;

FIG. 8 depicts a flow of an example processing in local virtual switch FIB updating, per ingress port or per collection of ports.

DETAILED DESCRIPTION OF THE DISCLOSURE

Figure 1:
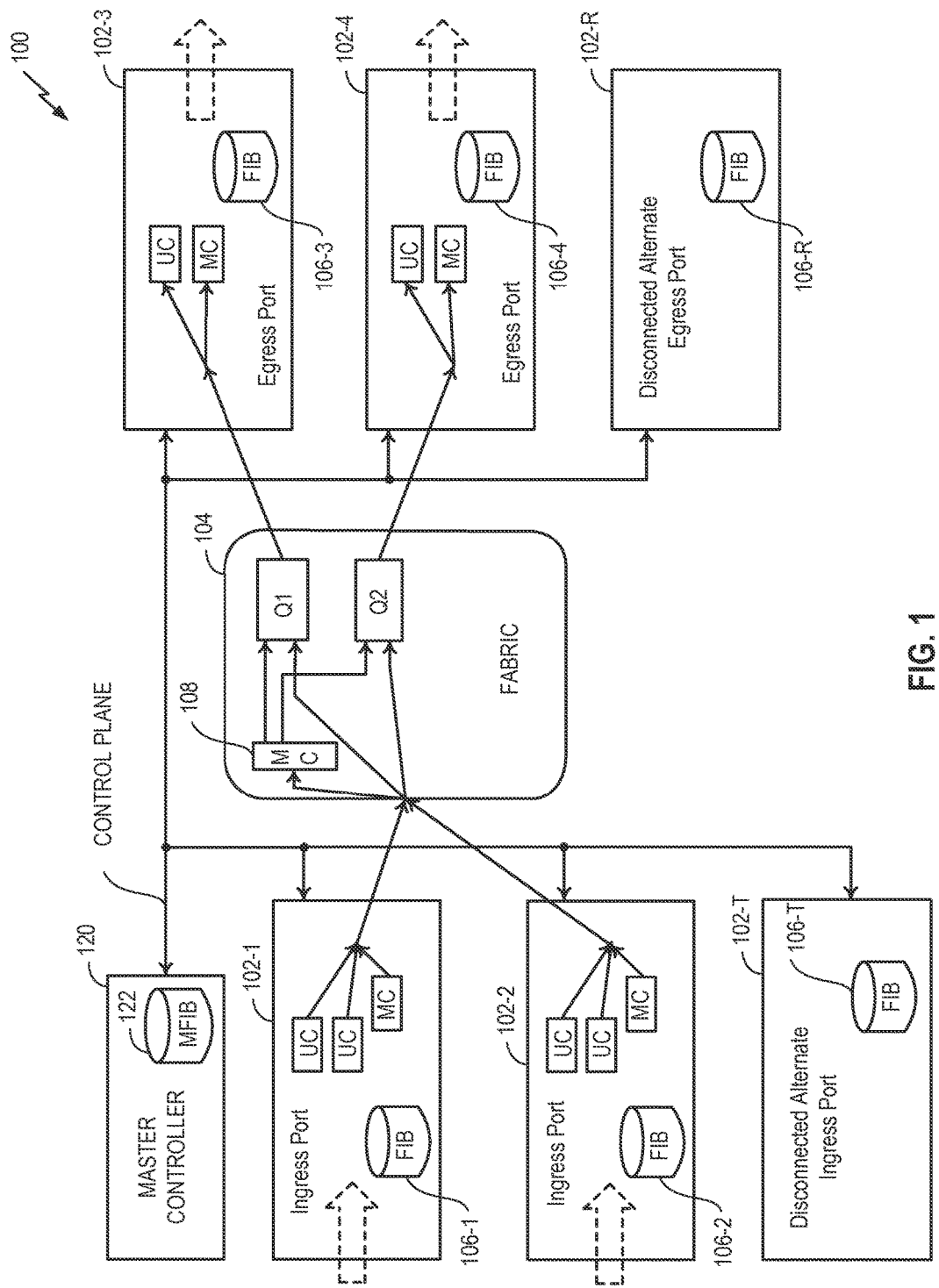
FIG. 1 depicts a fast replacement port virtual switch system according to one exemplary embodiment, in one state having an alternate logical port disconnected from a fabric, with a currently updated FIB according to one aspect.

In various exemplary embodiments, fast interlayer forwarding is described to emulate a fast Ethernet Local Area Network (ELAN) service restoration. The fast interlayer forwarding, instead of using fast packet switching/reroute, uses lower layer control plane functionally to reroute and have a bridge or virtual bridge substitute a failed member. For each line-side logical port member, a control plane call source can pre-compute or be told a preferred backup port, and the far-end is notified of this alternate endpoint, e.g., through signaling. Each end-point node installs a virtual switch instance on the alternate endpoint. When a switch occurs, the virtual switch FIB will be present on the line card and is useful to that new virtual switch member.

The fast interlayer forwarding is a modified form of the "hot standby" state connected to the fabric. This modified form of the "hot standby" state for the alternate endpoint involves providing the virtual switch FIB, but the alternate endpoint are not physically connected to the fabric, thereby avoiding consumption of resources in the fabric. Conventional techniques provide the FIB and physically connect the alternate endpoints. The fast interlayer forwarding modifies this technique by providing the FIB and not physically connecting the alternate endpoints until a switch occurs. In this manner, the virtual switch member for the alternate endpoint is there, but not connected to the fabric. Thus, the fast interlayer forwarding provides similar benefits to the fast packet switching/reroute techniques while not consuming fabric resources.

Again, the fast interlayer forwarding emulates the fast ELAN service restoration. ELAN is defined by the Metro Ethernet Forum in, inter alia, MEF Technical Specification MEF 6.2 "EVC Ethernet Services Definitions Phase 3" (August 2014) and MEF Technical Specification MEF 2 "Requirements and Framework for Ethernet Service Protection in Metro Ethernet Networks" (Feb. 8, 2004), the contents of which are incorporated by reference. MEF 2 describes the aforementioned "hot standby" state and "cold standby" state. Again, the fast interlayer forwarding is a modification of the "hot standby" state to achieve the benefits, i.e., fast restoration, without the drawbacks, i.e., wasted fabric resources when a member port is physically connected to the fabric.

In an exemplary embodiment, a fast replacement port virtual switch has a fabric connected to a plurality of ports, and one or more alternate ports that are kept disconnected from the fabric and, while disconnected, maintained with a local, updated copy of a master FIB. The fast replacement port virtual switch can have a master controller configured to detect automatically a failure of a member port and, in response, disconnect the failed member port, and connect and instantiate as a new member port, added member port, or replacement member port, the previously disconnected alternate port with its already current FIB, without intervention by higher-level network resources.

In FIG. 1, a block diagram illustrates a fast replacement port (FRP) virtual switch system (VSS) 100 according to one or more exemplary embodiments. It will be understood that "fast replacement port" as used in this disclosure is simply a name and adds nothing descriptive of structure, and that "FRP" has no inherent meaning and imports no meaning from outside this disclosure; it is simply an abbreviation for the name "fast replacement port." The FRP VSS 100 can be implemented in circuitry including, without limitation, an Application Specific Integrated Circuit (ASIC), a Field Programmable Gate Array (FPGA), a Network Processor (NP), a switch fabric, programmable logic devices, discrete gates, transistor logic, discrete hardware components, elements associated with a computing device, or any suitable combination thereof (collectively referred to herein as "circuitry").

The FRP VSS 100 includes, for example, four member logical ports, labeled 102-1, 102-2, 102-3 and 102-4, connected to a fabric 104 and further includes, in accordance with one or more exemplary embodiments, one alternate egress logical port 102-R and one alternate ingress logical port 102-T, each of which is disconnected from the fabric 102. It will be understood that "disconnected," in the context of describing the alternate logical ports 102-R, 102-T refers to occupying no Layer 2 bandwidth of the fabric 104 and requiring no substantive overhead by higher level network resources. For brevity in the description of example operations, the member logical ports 102-1, 102-2, 102-3, 102-4 are alternatively referenced hereinafter, collectively, as "member ports 102."

It will be understood that, in an aspect, one or more of the member ports 102 may be bi-directional and, therefore, the FRP VSS 100 is shown in with the member ports 102 in a particular state. More particularly, the FIG. 1 FRP VSS 100 is shown in a left-to-right unfolded flow state with the member ports 102-1, 102-2 functioning as "ingress" ports and the member ports 102-3, 102-4 functioning as "egress" ports. Accordingly, in the subsequent description referring to FIG. 1, the member ports 102-1, 102-2 are referenced alternatively as "ingress port" 102-1 and "ingress port" 102-2. Likewise, the member port 102-3 and the member port 102-4 are referenced alternatively as "egress port" 102-3 and "egress port" 102-4. It will be understood, therefore, that the FIG. 1 FRP VSS 100 can have other modes or states (not shown in FIG. 1) of its member ports 102. For example, without limitation, the egress port 102-3 may be an "ingress port" 102-3 (not explicitly shown in FIG. 1), and/or the ingress port 102-1 may be an "egress port" 102-1 (not explicitly shown in FIG. 1).

Each of the member ports 102 can have a port identifier, e.g., a port ID that is unique at least with respect to the member ports 102 of the fabric 104. The port identifiers of the member ports 102 are referenced hereinafter, in the alternative, as "port IDs." Implementation of the member port 102 port IDs can be in accordance with conventional techniques and protocols for identifying member ports of virtual switches, which can be readily adapted by persons of ordinary skill in the art, having view of the present disclosure, to practices according to one or more of the exemplary embodiments, without undue experimentation. Further detailed description of identifying the member ports 102 of the FRP VSS 100 is therefore omitted, except where incidental to described example operations.

A local FIB is associated with each of the member ports 102, individually labeled as FIB 106-1, FIB 106-2 . . . FIB 106-4. These local FIBs are collectively referenced in this description as "local FIBs 106," and generically referenced as a "local FIB 106." Each of the local FIBs 106 can include a plurality of MAC addresses and, for each of the MAC addresses, the port ID of another of the member ports 102 to which that address is bound.

When a member port 102 is functioning as an ingress port, e.g., one of the ingress ports 102-1, 102-2, it responds to reception of a packet by checking their local FIB 106 to see if it already has the packet's destination MAC address and its binding to another of the member ports 102. For example, when one of the ingress ports 102-1, 102-2 receives a packet, it checks the corresponding FIB 106-1, 106-2, to see if it has the packet's destination MAC address and it's binding to one of the egress ports 102-3, 102-4. Since the FIB 106 of the member port 102 that received the packet is local, the checking can be done quickly and without the resource overhead. If the destination MAC address is already in the FIB 106 of the receiving ingress port, e.g., in the FIB 106-1 of the ingress port 102-1 or the FIB 106-2 of the ingress port 102-2, the port ID of that destination MAC address is retrieved from the FIB 106 and the packet is sent to the fabric 104 with that port ID. The fabric 104, in response, routes the packet to the identified egress port, e.g., one of the egress ports 102-3, 102-4.

In an exemplary aspect, described later in greater detail, the FRP VSS 100 can be configured so that when a member port 102 receives a packet for which the destination MAC address is not in its local FIB 106, the member port 102 can initiate a process of identifying the member port 102, if any, that the MAC address is bound to. The initiating can include, for example, sending a notice to a master controller 120. Depending on a result of the identifying process, the local FIBs 106 of the member ports 102, the local FIB 106-R of the alternate logical port 102-R, and the local FIB 106-T of the alternate logical port 102-T can be updated accordingly, for example, by the master controller 120 having a master FIB (MFIB) 122, as described later in greater detail. Generally speaking, when an unknown destination MAC is received, a packet is flooded (via the fabric 104) to all other ports 102. The port 102 sending the packet may receive the packet it just sent and may need to discard. Note, the ports 102-R, 102-T are disconnected from the fabric 104 and can receive the updates related to the unknown destination MAC directly from the master controller 120.

It will be understood that although the egress ports 102-3, 102-4 are shown having the local FIBs 106-2, 106-3, respectively, that in an aspect these are employed only when their associated member ports 102 that are functioning as shown in FIG. 1. However, in aspects of updating the local FIBs 106, the FIBs 106 of egress ports are updated as well, to provide proper forwarding of packets when functioning as ingress ports.

The member ports 102 can be configured to provide, when functioning as an ingress port, e.g., the ingress ports 102-1, 102-2, one or more unicast output queues, such as the examples labeled "UC," and a multicast output queue such as the example labeled "MC." Each of the unicast output queues UC of a member port 102 may correspond to a specific one of the member ports 102 functioning as an egress port, e.g., one of the egress ports 102-3, 102-4. In other words, for any unicast output queue UC of any of the ingress ports 102-1, 102-2, all packets in that queue are for sending to the same one of the egress ports 102-3, 102-4. For any of the ingress ports 102-1, 102-2, all packets in its multicast queue MC are, as the name implies, for multicasting to all member ports 102. The unicast output queues UC and multicast output queue MC can be logic entities, for example, virtual queues within memory resources (not explicitly shown) that are local to the associated ingress port 102-1, 102-2.

The fabric 104 may be configured to support an output queue, e.g., Q1 and Q2, one for each of the egress ports 102-3, 102-4. The fabric 104 may be configured to support a multicast copy module 108 capable of receiving multicast packets, e.g., from any of the ingress ports 102-1, 102-2, and sending a copy of the multicast packet to the output queue (e.g., Q1 or Q2) for each of the egress ports 102-3, 102-4. Implementation of the output queues Q1 and Q2 and of the multicast copy module 108 can be in accordance with conventional techniques for multicast copying, and queuing outputs of a fabric. Persons of ordinary skill in the art, having view of the present disclosure, which readily adapt such conventional multicast copying and fabric output queuing techniques to practices according to one or more of the exemplary embodiments, without undue experimentation. Further detailed description of the output queues Q1 and Q2 and the multicast copy module 108 is therefore omitted, except where incidental to described example operations.

In an exemplary embodiment, the member ports 102 can be, for example, a configuration of various off-the-shelf conventional line cards (not explicitly shown in the figures) available from a number commercial vendors. Selecting and configuring such off-the-shelf conventional line cards to implement the member ports 102 to practice according to various exemplary embodiments can be performed persons of ordinary skill in the art, based on the present disclosure, without undue experimentation. Off-the-shelf line cards may be, but are not limited to being, off-the-shelf Ethernet line cards (not shown in the figures).

In another exemplary embodiment, the alternate logical port 102-R (or each of such alternate logical ports if more than one is used), can include particular adaptations of one or more conventional off-the-shelf line cards that are available from various commercial vendors. Selecting and adapting one or more off-the-shelf conventional line cards to implement the alternate logical port 102-R to practice according to various exemplary embodiments can be performed persons of ordinary skill in the art, based on the present disclosure, without undue experimentation. Likewise, the fabric 104 can be implemented by, for example, and without limitation, one or more off-the-shelf conventional switch fabric cards that are available from various commercial vendors and, based on the present disclosure, can be selected and configured by persons of ordinary skill in the art to practice according to various exemplary embodiments, without undue experimentation.

The FRP VSS 100 may be configured as capable of starting from, for example, a state in which the MFIB 122 and all the local FIBs 106 are blank, in other words, without information on any binding of any MAC addresses to any particular one of the member ports 102. In a further aspect, the FRP VSS 100 may be configured to be capable of automatically evolving from such a starting state by, for example, iterative construction of the MFIB 122 to have bindings of a plurality of MAC addresses to corresponding member ports 102. Further to this aspect, the member ports 102 may be configured such that, while functioning as ingress ports, e.g., the ingress ports 102-1, 102-2, they respond to receipt of packets with destination MAC addresses not in their local FIB by sending a notification (not explicitly shown in FIG. 1) to the master controller 120. The notification may be arbitrarily named, for example, as a "notice of unlisted MAC address." The notice of unlisted MAC address and can include that unlisted MAC address and, for example, the port ID of the ingress port 102-1, 102-2 that received the packet. Such notification, for example, may be performed by known conventional techniques of ingress ports of a virtual switch notifying a master controller of receipt of a packet with a destination MAC address not found in the receiving port's local FIB. Further detailed description of this notification is therefore omitted except where incidental to the description of an example operation.

Continuing with description of one example process of the FRP VSS 100 constructing the MFIB 122, the master controller 120 may, upon receiving the described notification of unlisted MAC address from the ingress port 102-1, 102-2, determine which of the member ports 102 the unlisted MAC address is bound to. The determination may include, for example, flooding all logical ports of the FRP VSS 100. In an aspect, such flooding may omit the ingress port, e.g., the ingress port 102-1, 102-2, that received the packet. Conventional techniques for such flooding, and determination of which, if any, of the member ports 102 the unlisted MAC address is bound to, are known to persons of ordinary skill in the art and, therefore, further detailed description is omitted. Assuming the destination MAC address is bound to one of the member ports 102, e.g., one of the egress ports 102-3, 102-4, the master controller 120 may place an entry in the MFIB 122 indicating that binding.

The above-described process of the ingress ports 102-1, 102-2 receiving packets having destination MAC addresses not in their local FIBs 106, sending of notifications of unlisted MAC address to the master controller 120, the corresponding flooding all member ports 102, and updating the MFIB 122 may continue until a determination is made to distribute the MFIB 122. The determination may be, for example, according to a schedule, or in response to an event, as described in greater detail later in this disclosure. Upon the determination, the master controller 120 may distribute the MFIB 122 to all the member ports 102 and, in accordance with one of the exemplary embodiments, also distributes the MFIB 122 to the alternate logical port 102-R, while disconnected from the fabric 104. Distribution of the MFIB 122 to the member ports 102 may be via out-of-band (OOB) control, in accordance with known conventional techniques for OOB distribution of a master FIB to logical ports of a virtual switch. Such techniques are known to persons of ordinary skill in the art and, therefore, further detailed description is omitted.

The member ports 102 may be configured to install appropriate portions of the MFIB 122 that they receive from the master controller 120 into their local FIBs 106. For example, "appropriate portions" may be less than the entirety of the MFIB 122 because, for example, a member port 102 may omit from its local FIB 106 the MAC addresses that are bound to that member port. Further to this aspect, each of the member ports 102 may include a distributed master FIB storage (not shown) for storing a distributed copy of the MFIB 122, and may include a local FIB installer (not explicitly shown). The local FIB installer for each of the member ports 102, in a further aspect, may be configured to install the appropriate portions of the distributed copy of the MFIB 122 from the distributed master FIB storage into the local FIB 106 in response to, for example, certain events. In a related aspect, the alternate logical port 102-R can include a distributed master FIB storage (not shown) for storing a distributed copy of the MFIB 122, and may include a local FIB installer (not explicitly shown). The local FIB installer for the alternate logical port 102-R, in a further aspect, may be configured to install the appropriate portions of the distributed copy of the MFIB 122 from the distributed master FIB storage into its local FIB 106-R. The installation may be, for example, in response to or integral with instantiating an added member port (not explicitly shown in FIG. 1) or replacement member port (not explicitly shown in FIG. 1) by connecting the alternate logical port 102-R to the fabric 104, as described in greater detail in later sections. Similarly, the alternate logical port 102-T, in a further aspect, may be configured to install the appropriate portions of the distributed copy of the MFIB 122 from the distributed master FIB storage into its local FIB 106-T.

As illustration of installing appropriate portions of the MFIB 122 into the local FIBs 106, assume the ingress port 102-1 as a first logical port and the egress port 102-3 as a second logical port, and assume that each has received the MFIB 122. The member port 102 functioning as the ingress port 102-1 may be configured to perform, for example, in response to certain events, an installing of a first FIB, e.g., into the FIB 106-1, based on the MFIB 122 distributed to it. Similarly, the member port 102 functioning as the egress port 102-3 may be configured to perform, in response to certain similar events, an installing of a second FIB, e.g., into the FIB 106-3, based on the MFIB 122 distributed to it. With respect to implementations of the local distributed FIB storage and the local FIB installed at each of the member ports 102, and their respective operations of storing and installing appropriate portions of the MFIB 122, these may be, for example, in accordance with conventional techniques for updating local FIBs for member ports of a virtual switch. Such conventional FIB storage and installation techniques are known to persons of ordinary skill in the art and, therefore, the further detailed description is omitted.

In various exemplary embodiments, the FRP VSS 100 may be configured to keep the alternate logical port 102-R disconnected from the fabric 104 until detection of a failure of one of the member ports 102. One aspect of such detection may be particular to detecting failure of the member ports 102 in their function as egress ports, e.g., detecting a failure of the egress port 102-3 or the egress port 102-4. In an aspect, the master controller 120 may be configured to detect such failures. In one further aspect, the master controller 120 may be configured to perform, upon detection of such failure, automatic disconnection of the detected egress port, e.g., one of the egress ports 102-3, 102-4, from the fabric 104, and automatic replacement with the alternate logical port 102-R. Accordingly, the alternate logical port 102-R provides protection for one of the egress ports 102-3, 102-4, in a modified "hot standby" mode.

Figure 2:
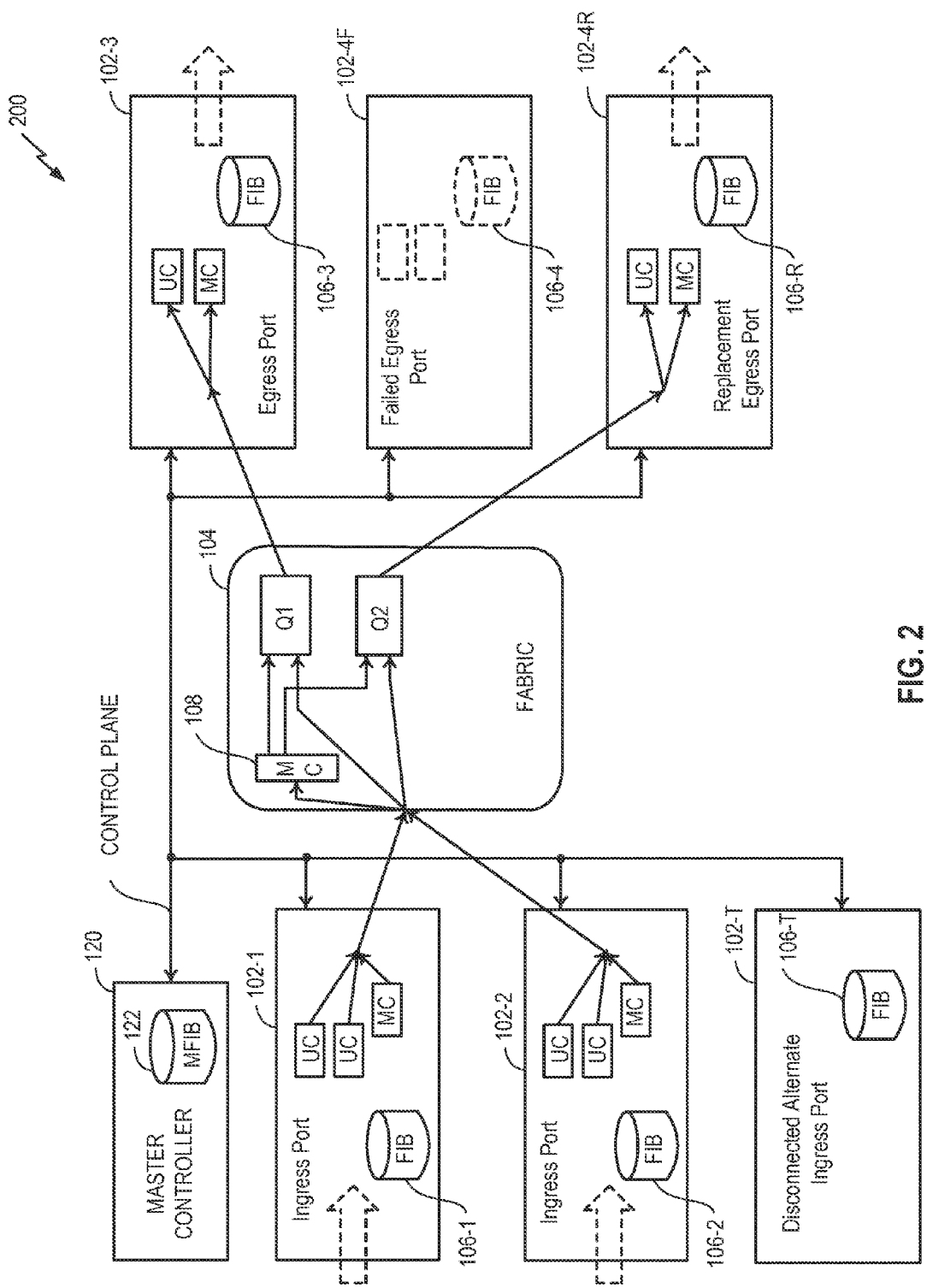
FIG. 2 depicts the fast replacement port virtual switch system of FIG. 1 according to one exemplary embodiment, in one state having a new replacement port with an already updated FIB, by connecting the previously disconnected alternate logical port to the fabric, according to one aspect.

Referring to FIG. 2, a block diagram illustrates a new state 200 of the FRP VSS 100 of FIG. 1 according to one exemplary embodiment, after disconnecting the egress port 102-4 and connecting to the fabric 104, as its replacement egress port 102-4R, the alternate logical port 102-R. In an aspect, the FRP VSS 100 may be configured to include, in a process of or associated with detecting a failure of one of the member ports 102, e.g., the egress port 102-4, a determining a usability of the fabric 104 egress port feed queue that previously fed the failed member port.

In a related aspect, the FRP VSS 100 may be configured to use the fabric 104 egress port feed queue for the replacement egress port 102-4R if that egress port feed queue is determined usable. FIG. 2 shows an example in accordance with this related aspect, as the new state 200 reflects a determination of the egress port feed queue Q2 that fed egress port 102-4 prior to its disconnection being still usable, and therefore used by the replacement egress port 102-4R.

Figure 3:
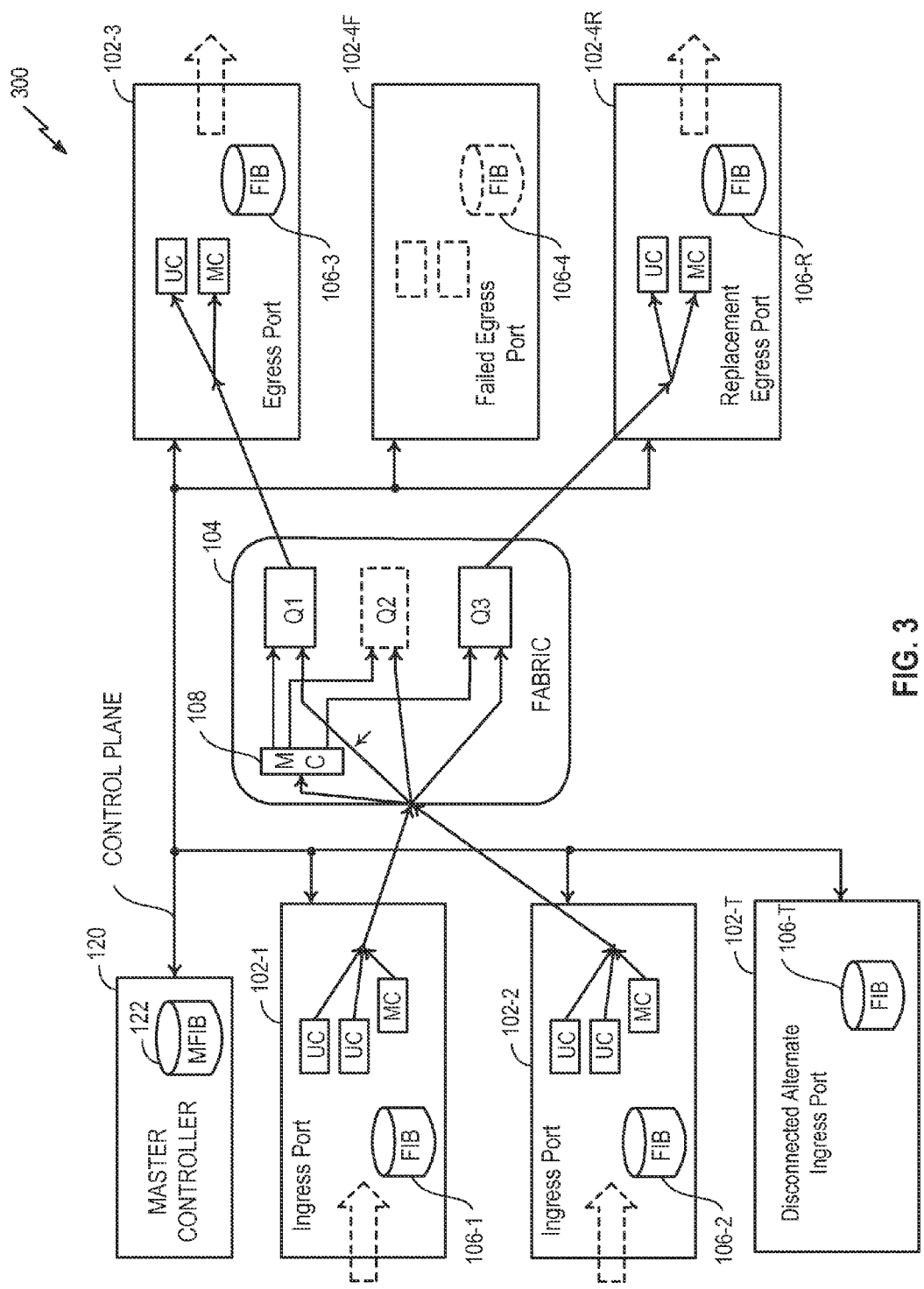
FIG. 3 depicts the fast replacement port virtual switch system of FIG. 1 according to one exemplary embodiment, in one alternative state having a new member port with an already updated FIB, formed by connecting to the fabric the previously disconnected alternate port, using a new feed queue, according to one aspect.

In another related aspect, the FRP VSS 100 may be configured to instantiate in the fabric 104 a new egress port feed queue for the replacement egress port 102-4R if the egress port feed queue for the now failed egress port is determined unusable. FIG. 3 shows an example in accordance with this related aspect. More particularly, state 300 reflects a determination that the egress port feed queue Q2 that fed egress port 102-4 prior to its disconnection is unusable, and a corresponding assignment to the replacement egress port 102-4R of a new egress port feed queue Q3. In a further aspect, the FRP VSS 100 may be configured to distribute notice of the assignment of a new egress port feed queue, e.g., egress port feed queue Q3, to all the member ports 102 for their corresponding update of their local FIBs 106.

Figure 4:
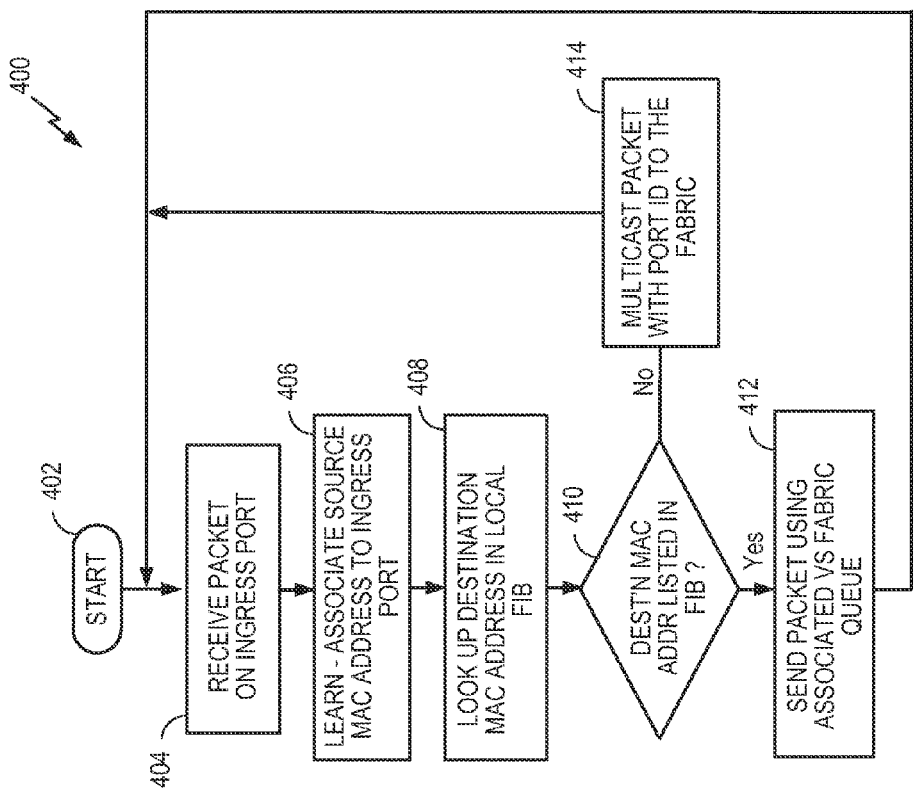
FIG. 4 depicts a flow of an example local MAC address processing according to one exemplary embodiment.

FIG. 4 depicts a flow 400 of an example local MAC address processing according to one exemplary embodiment. Certain illustrative operations according to the flow 400, and according to flows described in reference to FIGS. 5-8, are described in reference to the FIG. 1 FRP VSS 100. It will be understood, though, that processes according to the FIGS. 4-8 are not limited to the FIG. 1 FRP VSS 100, and may be performed on various modifications of the FIG. 1 FRP VSS 100 that may become apparent to persons of ordinary skill in the art from reading this disclosure.

Example operations according to the flow 400 can begin at an arbitrary start state, represented by block 402. The start state 402 may be an initial power-up state, having the MFIB 122 and all of the local FIBs 106 substantially blank. Alternatively, the start state 402 can be an operational state where the MFIB 122 has been earlier constructed and distributed to the local FIBs 106. In one example operation, at block 404, a packet can be received at an ingress port, e.g., at one of the ingress ports 102-1, 102-2. The packet (not shown in FIG. 4) includes a source MAC address and a destination MAC address. In response, at block 406, learning is performed, which associates the source MAC address with the receiving ingress port. Next, at block 408, the local FIB 106 of the receiving ingress port 102 is searched to determine if it has the destination MAC address. For example, if the packet is received, at block 402, by the ingress port 102-2, the local FIB 106-2 is searched, at block 408. Referring to decision block 410, if the answer from the search at block 408 is NO, the received packet can be sent multicast to the fabric 104 with the receiving ingress port number. If the answer from the search at block 408 is YES, the received packet is sent to the associated virtual switch fabric queue provided by the local FIB 106. The flow 400 can then return to the arbitrary start 402 until another packet is received.

Figure 5:
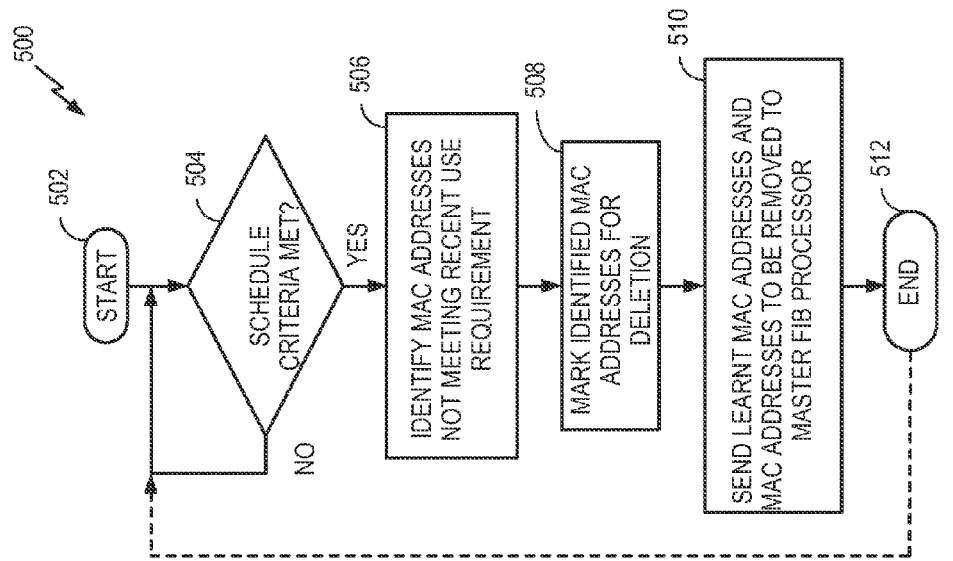
FIG. 5 depicts a flow of an example processing in sharing of local MAC address information according to one exemplary embodiment.

FIG. 5 depicts a flow 500 of an example processing in sharing of local MAC address information with the master FIB 122 according to one exemplary embodiment. In an aspect, sharing of local MAC address information according to the flow 500 can be periodically performed for each of the local FIBs 106. One objective of the sharing provided by the flow 500 is to provide the master controller 120 with new MAC addresses learned by the local FIBs 106, for adding to the master FIB 122. Another objective of the sharing provided by the flow 500 is to inform the master controller 120 of MAC addresses that the local FIBs 106 have not recently used, for removal from the master FIB 122.

Operation according to the flow 500 can begin at an arbitrary start state, represented by block 502 and proceed to block 504, which represents schedule criteria for locals FIBs 106 to share their information with the master controller 120, for it to update the master FIB 122 accordingly. As can be understood by persons of ordinary skill in the art from reading this disclosure in its entirety, specific schedule criteria used or applied at block 504 can be application specific. However, such persons, by applying the knowledge of conventional techniques of master FIB updating that such persons possess to the present disclosure, can readily select or set such criteria without undue experimentation. The further detailed description is therefore omitted.

For example, it is assumed that scheduling criteria are met at block 504, whereupon the flow 500 can, at block 506, identify MAC addresses in the local FIB 106 for which time since last use exceeds a given requirement. As to details of the time to last use, these can be application specific and persons of ordinary skill in the art, by applying the knowledge of FIB management that such persons possess to the present disclosure, can identify such requirements without undue experimentation. Further detailed description of the time since last use requirements applied at block 506 are is therefore omitted. After identifying at block 506 MAC addresses in the local FIB 106 for which a time since last use exceeds a given requirement, operations according to the flow 500 can, at block 508, mark such MAC addresses for deletion. The marking can be according to conventional FIB entry marking techniques and, therefore, the further detailed description is omitted. Next, at block 510, the MAC addresses marked at block 508 to be removed, as well as the learned MAC addresses can be sent to the master controller 120. The flow 500 can then end at block 512, and return to block 504 when the local FIB sharing schedule criteria are again met.

Figure 6:
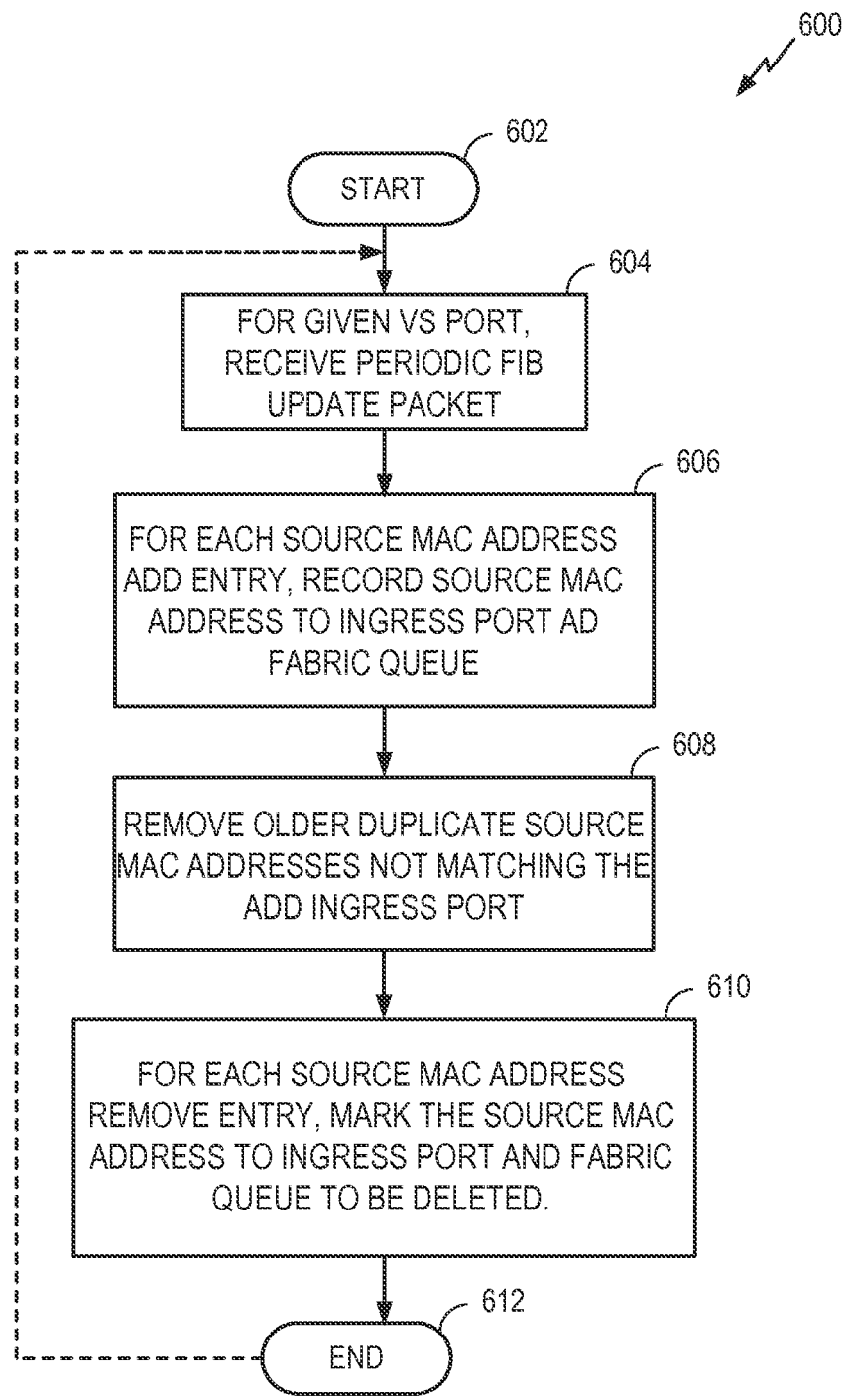
FIG. 6 depicts a flow of an example processing in master virtual switch FIB updating according to one exemplary embodiment.

FIG. 6 depicts a flow 600 of an example processing for updating the master FIB 122 to reflect, for example, the information shared according to the flow 500. Operation according to the flow 600 can begin at an arbitrary start state, represented by block 602 and, upon the master controller 120 receiving at block 604 a periodic FIB update packet with update information related to the local FIB 106 of one of the ingress ports 102, can proceed to block 606. It will be understood that specific update operations at block 606 and subsequent blocks that follow can depend, at least in part, on the content of the FIB update packet. In an aspect, the FIB update packet received at block 604 can include update information for multiple ingress ports 102. Regarding types of update information, this can include associations of new source MAC addresses with specific ingress ports 102. For example, information may associate two new MAC addresses with the ingress port 102-1 and one new MAC address with the ingress port 102-2. Some of the associations will effectively remove old associations in the master FIB 122 of a given MAC address with a given ingress port. In an aspect, at block 606 one or more new entries are added to the master FIB 120, and each entry can include the association of a source MAC address to an ingress port and the fabric queue for forwarding by the fabric 104.

Continuing to refer to FIG. 6, example operations according to the flow 600, after adding new entries to the master FIG. 122 at block 606, can proceed to block 608. At block 608 older entries that have the same source MAC address that is associated with one of the added entries, but for a different ingress port 102, are substituted in the master FIB 120. Operations according to the flow 600 can then, at block 610, mark the source MAC address to ingress port 102, and corresponding fabric queue to be deleted. The flow 600 can then end at block 612, and return to block 602 or block 604 upon receiving another FIB update packet.

An example distribution of the updated master controller 122 to all the local FIBs 106 of a given virtual switch will now be described. The distribution can take place, for example, after an updating as described in reference to FIG. 6, according to a schedule, or event-driven, but not with too high frequency. Regarding the criteria, and frequency, it will be appreciated by persons of ordinary skill in the art from reading this disclosure in its entirety that these can be application specific. However, such persons, applying the knowledge of conventional FIB distribution techniques such persons possess to the present disclosure, can readily select or set such a distribution schedule without undue experimentation. The further detailed description is therefore omitted.

FIG. 7 depicts a flow 700 of example operations of distributing the master FIB 122 to the local FIBs according to one exemplary embodiment. Example operations according to the flow can start at an arbitrary state 700, and when the above-described schedule criteria are met at block 704, can proceed to block 706 and distribute the master FIB 122 to all of the FIBs 106 of the virtual switch depicted in FIG. 1. Next, at block 708, the master FIB 122 can remove all MAC address delete entries marked at block 610 in the FIG. 6 flow 600, end at block 710, and return to block 704 when the master FIB distribution schedule criteria are again met.

An example processing at local FIBs 106 to update in accordance with the master FIB 122 distributed by the flow 700 will now be described. FIG. 8 depicts an example flow 800 of an example processing at the local FIBs 106 in a local virtual switch FIB updating, per ingress port or per collection of ports, using the master FIB 122 distributed, for example, by the flow 700.

Operation according to the flow 800 can begin at an arbitrary start state, represented by block 802 and, upon the virtual switch receiving, at block 804, the master FIB 122 information, can proceed to block 806. At block 806, for each source MAC address entry, the local FIB can record and process the entries associated information.

Figure 9:
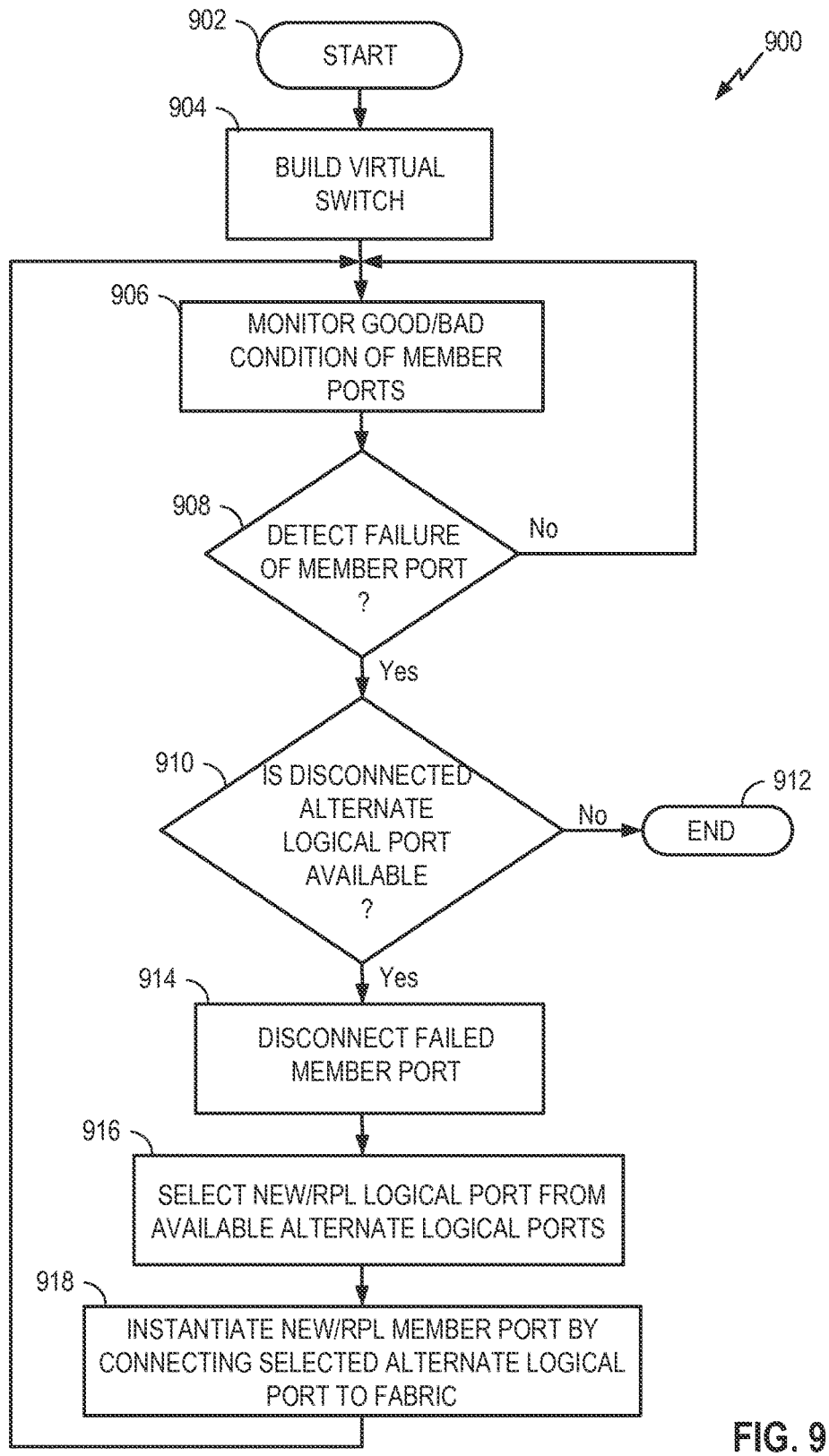
FIG. 9 depicts a flow of an example processing of building a virtual switch in one example fast replacement port virtual switching, including replacement of a failed member port with a new member port by connecting, to the fabric, a previously disconnected alternate port having an already updated FIB, in accordance with one exemplary embodiment.

Fast replacement of an ingress port in accordance with one or more exemplary embodiments will now be described. FIG. 9 shows a high-level diagram of one process flow 900 of one example fast replacement port virtual switch method in accordance with one or more exemplary embodiments. As will be appreciated, the process flow 900 can include building a virtual switch, and providing an automatic replacement of a failed member port with a previously disconnected alternate logical port, having an already updated FIB.

Referring to FIG. 9, one example operation further to the process flow 900 may start at an arbitrary start state represented by block 902, then proceed to block 904 and build a fast replacement port virtual switch, such as the FIG. 1 FRP VSS 100 having, in addition to operational ports 102, at least one alternate logical port 102-R, 102-T having an updated FIB 106-R, 106-T. The building can be, for example, can be in accordance with flows 400, 500, 600, 700, and 800 described in reference to FIGS. 4-8.

In an aspect, after the building at block 904, the flow 900 can at block 906 monitor the Layer 2 operation of the FIG. 1 FRP VSS 100. Upon detection of a failure of a member port, which is a YES at block 908, the flow 900 can go to block 910. The monitoring at block 906 and detecting at block 908 may overlap building of the virtual switch at block 904. The monitoring at block 906 and detecting at block 908 can be in accordance with conventional techniques of monitoring and detecting failure of member ports of a Layer 2 virtual switch. Persons of ordinary in skill in the art, based on the present disclosure, may adapt such conventional monitoring and detecting techniques to implement blocks 906, 908 without undue experimentation. Further detailed description of such conventional techniques is therefore omitted.

Continuing to refer to FIG. 9, upon detecting a failure of a member port at 908, i.e., a YES, a determination can be made, at 910, as to whether any disconnected alternate logical port is available. For example, referring to FIGS. 2 and 3, if alternate logical port 102-R is the only alternate logical port provided and, after its connection and instantiation in accordance with FIG. 9, there will be no remaining alternate logical port. The answer at 910 may, in such a scenario, be NO. One resulting operation according to the flow 900 can be to transition to an END state at 912. Conventional techniques of repair and re-allocation (not shown in the figures) may then be applied.

If the answer at block 910 is YES, i.e., another alternate logical port is available, the flow 900 may, at block 914 disconnect the failed member port. In FIGS. 1-3, one example of a disconnecting at block 914 would be the disconnecting of the FIG. 1 egress port 102-4, to the disconnected state shown in FIGS. 2 and 3.

Referring still to FIG. 9, after disconnecting the failed member port at block 914 the process flow 600, in an aspect, assuming at least one alternate logical port is available, the flow 900 can, at block 916, select among the at least one available alternate logical ports for the replacement for the failed member port. In one aspect, the selecting at block 916 may be configured to depend, at least in part, on which member port failed. In a related aspect, the selecting at block 916 may be configured as a pre-assignment. For example, in an aspect, each member port of a fast replacement port VSS in accordance with one or more exemplary embodiments may have a pre-assigned one or more specific alternate logical ports.

It will be appreciated that, in accordance with various exemplary embodiments, the local FIB of alternative logical port selected at block 916 has already been updated during the time it was disconnected from the fabric, as described, for example, in reference to FIGS. 4-8.

Operations according to the flow 900, after selecting the replacement member port at block 916 may proceed to block 918 and instantiate the new or replacement member port by connecting the alternate logical port identified at block 916 to the fabric. In one aspect, the instantiation at block 918 may include a determination of whether or not the fabric egress port feed queue that fed the member port that failed is usable by the replacement member port, and conditional on a result of that determination, either using or not using that fabric egress port feed queue.

Those skilled in the pertinent art will appreciate that various embodiments may be described in terms of logical blocks, modules, circuits, algorithms, steps, and sequences of actions, which may be performed or otherwise controlled with a general purpose processor, a DSP, an application-specific integrated circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments disclosed herein may be implemented as electronic hardware, computer software, or any suitable combinations thereof. To illustrate interchangeability of hardware and software, various illustrative components, blocks, modules, circuits, algorithms, and steps have been described above in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor, and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. The terms "disk" and "disc," as used herein, include compact disc (CD), laser disc, optical disc, digital versatile disc (DVD), floppy disk and Blu-ray disc that store and reproduce data magnetically, and or that reproduce data optically with, for example, lasers. Combinations of the above should also be included within the scope of computer-readable media.

In addition, any disclosed connection or coupling can embody a computer-readable medium. For example, if software is described as transmitted from a website, server, or other remote source using, for example, a coaxial cable, fiber optic cable, twisted pair, or digital subscriber line (DSL), then the coaxial cable, fiber optic cable, twisted pair, DSL, or wireless technologies can be within the definition of computer readable medium that applies in this disclosure. Likewise, if software is described as transmitted from a website, server, or other remote source using, for example, a wireless technology such as infrared, microwave or other radio, then the infrared, microwave or other radio can be within the definition of computer-readable medium that applies in this disclosure.

While the foregoing disclosure shows illustrative embodiments that may be used to provide fast port recovery virtual switching, those skilled in the pertinent art will appreciate that various changes and modifications could be made herein without departing from the scope or spirit of the disclosure, as defined by the appended claims. The functions, steps, operations, and/or actions of the method claims in accordance with the embodiments disclosed herein need not be performed in any particular order. Furthermore, although elements of the aspects and embodiments disclosed herein may be described or claimed in the singular, the plural is contemplated unless limitation to the singular is explicitly stated.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, implemented in a packet switch system, for fast interlayer forwarding, the method comprising:
constructing a master Forwarding Information Base (FIB) which associates each of a plurality of packet source addresses with a corresponding member port among a plurality of member ports interconnected by a fabric; and
distributing the master FIB to the member ports interconnected by the fabric and to at least one alternate logical port that is disconnected from the fabric, wherein the at least one alternate logical port is configured to protect one of the member ports interconnected by the fabric, wherein the at least one alternate logical port is in a modified hot standby state that is disconnected from the fabric thereby avoiding consumption of resources in the fabric.

2. The method of claim 1, further comprising:
instantiating a new member port connected to the fabric by connecting the alternate logical port to the fabric, wherein, once connected to the fabric, the new member port processes packets with a FIB already stored thereon based on the distributing.

3. The method of claim 1, further comprising:

removing a failed member port among the member ports by disconnecting the failed member port from the fabric; and instantiating a replacement member port by connecting the alternate logical port to the fabric, wherein, once connected to the fabric, the replacement member port processes packets with a FIB already stored thereon based on the distributing.

4. The method of claim 1, wherein the at least one alternate logical port is configured to provide a fast packet switching/reroute technique while not consuming resources on the fabric when disconnected from the fabric.

5. The method of claim 1, further comprising:
instantiating an added member port by connecting the alternate logical port to the fabric; and
installing an added port FIB at the added member port, based on the master FIB distributed to the alternate logical port.

6. The method of claim 5, further comprising:
receiving at the added member port a packet having a source address;
checking the added port FIB to determine whether the source address is associated with another of the member ports and, if the source address is associated with another of the member ports,
sending to the fabric the packet and an identifier of the another of the member ports, and
routing the packet through the fabric to the another of the member ports, based on said identifier.

7. The method of claim 1, wherein the distributing distributes the master FIB to a first member port and to a second member port among the member ports, and further comprising
installing a first FIB at the first member port, based on the master FIB distributed to the first member port, and
installing a second FIB at the second member port, based on the master FIB distributed to the first member port.

8. The method of claim 7, further comprising associating the second member port with a port feed queue of the fabric, wherein the port feed queue is a first member port feed queue, the method further comprising
instantiating an added member port by connecting the alternate logical port to the fabric,
installing an added port FIB at the added member port, based on the master FIB distributed to the alternate logical port, and
associating the added member port with a second port feed queue of the fabric.

9. The method of claim 8, further comprising:
updating the first port FIB to indicate the association of the added member port with the second port feed queue of the fabric.

10. The method of claim 9, further comprising:
removing the second member port from the member ports by disconnecting the second member port from the fabric;
instantiating a replacement member port by connecting the alternate logical port to the fabric;
installing a replacement port FIB at the replacement member port, based on the master FIB distributed to the alternate logical port; and
associating the replacement member port with a second port feed queue of the fabric.

11. A packet switch configured for fast interlayer forwarding, the packet switch comprising:
circuitry configured to construct a master Forwarding Information Base (FIB) which associates each of a plurality of packet source addresses with a corresponding member port among a plurality of member ports interconnected by a fabric; and
circuitry configured to distribute the master FIB to the member ports interconnected by the fabric and to at least one alternate logical port that is disconnected from the fabric, wherein the at least one alternate logical port is configured to protect one of the member ports interconnected by the fabric, wherein the at least one alternate logical port is in a modified hot standby state that is disconnected from the fabric thereby avoiding consumption of resources in the fabric.

12. The packet switch of claim 11, further comprising:
circuitry configured to instantiate a new member port connected to the fabric by connecting the alternate logical port to the fabric, wherein, once connected to the fabric, the new member port processes packets with a FIB already stored thereon based on the distributing.

13. The packet switch of claim 11, further comprising:
circuitry configured to remove a failed member port among the member ports by disconnecting the failed member port from the fabric; and
circuitry configured to instantiate a replacement member port by connecting the alternate logical port to the fabric, wherein, once connected to the fabric, the replacement member port processes packets with a FIB already stored thereon based on the distributing.

14. The packet switch of claim 11, wherein the at least one alternate logical port is configured to provide a fast packet switching/reroute technique while not consuming resources on the fabric when disconnected from the fabric.

15. The packet switch of claim 11, wherein the circuitry configured to distribute is configured to distribute the master FIB to a first member port and to a second member port among the member ports, and further comprising
circuitry configured to install a first FIB at the first member port, based on the master FIB distributed to the first member port, and
circuitry configured to install a second FIB at the second member port, based on the master FIB distributed to the first member port.

16. The packet switch of claim 15, further comprising:
circuitry configured to associate the second member port with a port feed queue of the fabric, wherein the port feed queue is a first member port feed queue;
circuitry configured to instantiate an added member port by connecting the alternate logical port to the fabric,
circuitry configured to install an added port FIB at the added member port, based on the master FIB distributed to the alternate logical port, and
circuitry configured to associate the added member port with a second port feed queue of the fabric.

17. A packet switch system configured for fast interlayer forwarding, the packet switch comprising:
one or more member ports each comprising an associated Forwarding Information Base (FIB);
a fabric interconnecting the one or more member ports; and
at least one alternate logical port configured to protect a member port of the one or more member ports, wherein the at least one alternate logical port is disconnected from the fabric while protecting the member port, and wherein the at least one alternate logical port comprises an associated FIB that is maintained while the at least one alternate logical port is disconnected from the fabric, wherein the at least one alternate logical port is in a modified hot standby state that is disconnected from the fabric thereby avoiding consumption of resources in the fabric.

18. The packet switch system of claim 17, further comprising:
- a master controller configured to maintain a Master FIB (MFIB) and to distribute updates therefrom to the one or more member ports and the at least one alternate logical port.

19. The packet switch system of claim 17, wherein a new member port is instantiated responsive to a failure of the member port by connecting the at least one alternate logical port to the fabric, wherein, once connected to the fabric, the new member port processes packets based on the associated FIB that is maintained while the at least one alternate logical port is disconnected from the fabric.

20. The packet switch system of claim 17, wherein the at least one alternate logical port is configured to provide a fast packet switching/reroute technique while not consuming resources on the fabric when not active.

* * * * *